US006034867A

United States Patent [19]

Seo

[11] Patent Number: 6,034,867

[45] Date of Patent: Mar. 7, 2000

[54] PORTABLE COMPUTER HAVING A LOCKING ASSEMBLY

[75] Inventor: Yeol-Gu Seo, Suwon, Rep. of Korea

[73] Assignee: SamSung Electronics Co., Ltd., Kyungki-do, Rep. of Korea

[21] Appl. No.: 08/878,847

[22] Filed: Jun. 19, 1997

[30] Foreign Application Priority Data

Jun. 20, 1996 [KR] Rep. of Korea ...................... 96-22497

[51] Int. Cl.[7] ............................... G06F 1/16; E05D 11/10

[52] U.S. Cl. ............................................... 361/683; 16/328

[58] Field of Search ..................................... 361/681–683; 16/223, 327, 328, 331; 292/175; 248/615, 345.1; 364/708.1

[56] References Cited

U.S. PATENT DOCUMENTS 3,525,544 8/1970 Jacobs .
4,495,672 1/1985 Adams .
4,503,584 3/1985 Malchow .
4,598,940 7/1986 DeGroat .
4,926,365 5/1990 Hsieh .
4,978,949 12/1990 Herron et al. .
5,103,376 4/1992 Blonder .
5,105,506 4/1992 Lin .
5,166,893 11/1992 Hosoi .
5,196,993 3/1993 Herron et al. .
5,251,102 10/1993 Kimble .
5,430,607 7/1995 Smith ...................................... 361/683
5,498,052 3/1996 Severini et al. .
5,507,072 4/1996 Youn ......................................... 16/261
5,550,712 8/1996 Crockett .................................. 361/752
5,568,357 10/1996 Kochis et al. .......................... 361/681
5,583,742 12/1996 Noda et al. ............................. 361/683
5,594,619 1/1997 Miyagawa et al. ..................... 361/681
5,724,704 3/1998 Seo ........................................... 16/254

*Primary Examiner*—Lynn D. Feild
*Attorney, Agent, or Firm*—Robert E. Bushnell, Esq.

[57] ABSTRACT

Disclosed is the improved locking assembly of a display panel in order to enlarge the display of a portable personal computer. A portable computer having a locking assembly coupled to hinging shafts including a setting member, a locking member connected and disconnected to the setting member to allow the cover to open or close, a rectangular aperture formed over the position where the hinging shaft is engaged, a fixing member for being coupled to the locking groove so as not to allow the hinged shaft to rotate, a handling member for being coupled to the fixing member and controlling its operation, and an elastic member for being coupled to the fixing member and pushing the fixing member toward the hinging shaft. Therefore, the portable computer having the locking assembly can provide a larger display in a limited space while the volume of the portable computer is not increased, and thereby leading to relieving consumers of complaints due to a small display.

11 Claims, 4 Drawing Sheets

PORTABLE COMPUTER HAVING A LOCKING ASSEMBLY

One goal in designing portable computers is to design one that is compact yet has a large display screen. This goal could be hampered by the latching or locking mechanisms that prevent the full width of the portable computer from being used as a display screen. One solution to this problem is to have the latching or locking mechanism combined with the hinge shaft of a portable computer. U.S. Pat. No. 5,103,376 for a Dual Position Computer Arrangement to Blonder discloses a notebook computer that contains a dual pivot hinge whereby the locking mechanism does not appear to interfere with the size of the display screen. U.S. Pat. No. 5,498,052 for a Seat Hinge and Latch Assembly With Bi-Directional Release to Severini et al. discloses the notion of comprising a hinge shaft with a latch for a seat inside an automobile.

I have not seen a latch or locking mechanism combined with a hinge as applied to enclosures such as portable computers. Such a feature would allow for a larger display size in portable computers for a given portable computer size.

SUMMARY OF THE INVENTION

It is therefore an object of the present invention to provide an enclosure in which the locking mechanism thereof is connected to a hinging shaft so as to ensure a more enlarged space of a display.

According to one of the aspects of the present invention to accomplish the object above, a portable computer whose base and cover having a display are coupled to a hinging shaft comprises a setting member formed on at least one end of the hinging shafts, and a locking means for being connected and disconnected to the setting member for allowing the cover to open or close.

In such an invention, the setting member is a locking groove formed on an end of the hinging shaft 10 which has a “-” shaped structure.

The locking means includes a rectangular aperture formed over the position where the hinging shaft is engaged, a fixing member for being coupled to the locking groove so as not to allow the hinging shaft to rotate, a handling member for being coupled to the fixing member and controlling its operation and an elastic member for being coupled to the fixing member and pushing the fixing member toward the hinging shaft.

In this invention, the fixing member faces to the hinging shaft in the same height, and has a stopper to be inserted into the locking groove and a connector which is coupled to a stopper and has a connecting hole, through which the handling member is coupled to the fixing member, formed over the stopper.

The handling member is an external manual slide that includes a keeper having a keeping lug formed under it, which engages the connecting hole through the rectangular aperture.

The elastic member includes a guide lug formed on the outer surface of the fixing member; a fixing lug formed on the inner surface of the base; and a compression coil spring which will not deviate out of it when the fixing lug and the guide lug will have been interconnected to each other.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1A:
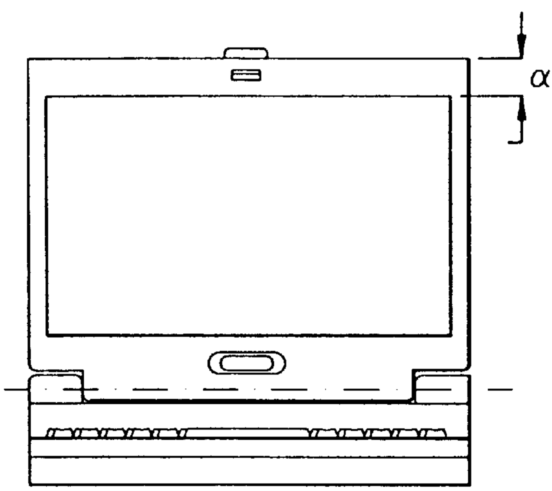
FIGS. 1A and 1B are front views of a conventional portable computer having latch assemblies of a respective display panel thereof.
Figure 1B:
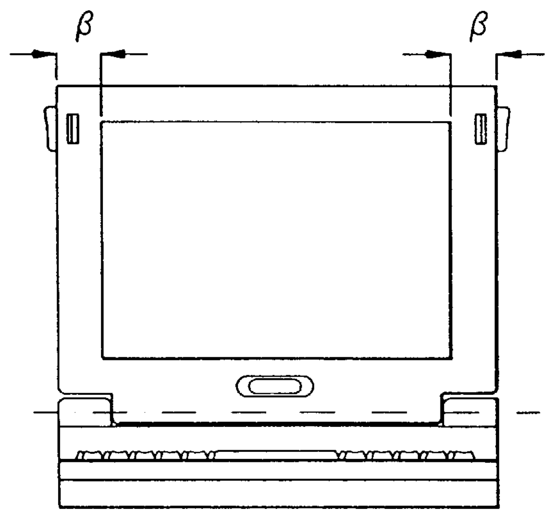

FIGS. 1A and 1B each show schematically the structure of an earlier portable computer. The respective computer as noted above is provided with a locking or latching mechanism to prevent the display panel from opening during transportation or storage. The portable computer of FIG. 1A is supplied with a locking mechanism mounted at a central portion of the top of the display panel and on a corresponding, matching part of the base. In FIG. 1B, the computer has locking mechanism that is mounted at the edges of the top portion of the display panel and on the corresponding part of the base.

Figure 2:
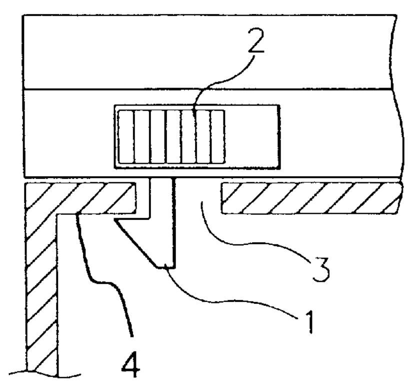
FIG. 2 is a sectional view partially showing a detailed structure of a conventional latch assembly.

The locking mechanism stated above, referring to FIG. 2, typically includes a hook-shaped locking pawl 1, an external manual slide 2 which is interconnected to pawl 1 and movable backward and forward across an aperture 3 through which pawl 1 is allowed to fasten to base 4. In such a structure, the installation of the locking mechanism to the display panel requires a certain space, “α” or “β” on the upper side or each edge of the display panel to be set aside at the exclusion of the display panel.

Further, there has been another problem that the unwanted protrusions of the locking pawl 1 may not only detract from the aesthetics of the computer and be prone to break due to an external shock. Such a structure has interfered with production of a variety of designs. In particular, the computer marketplace demands a portable computer whose the display is larger, while a computer body has a relatively small volume and occupies a relatively small space. However, a design involving a larger display has been limited by the structure and position of the locking mechanism.

Figure 3A:
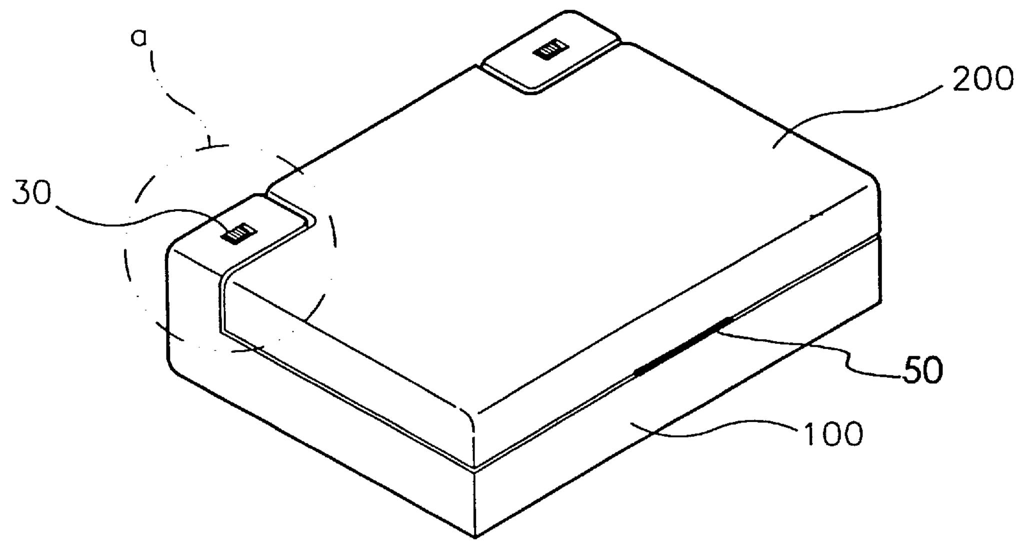
FIG. 3A is a perspective view of a portable computer with its cover closed according to the present invention and FIG. 3B is an exploded view showing the internal structure of portion “a” in FIG. 3A.
Figure 3B:
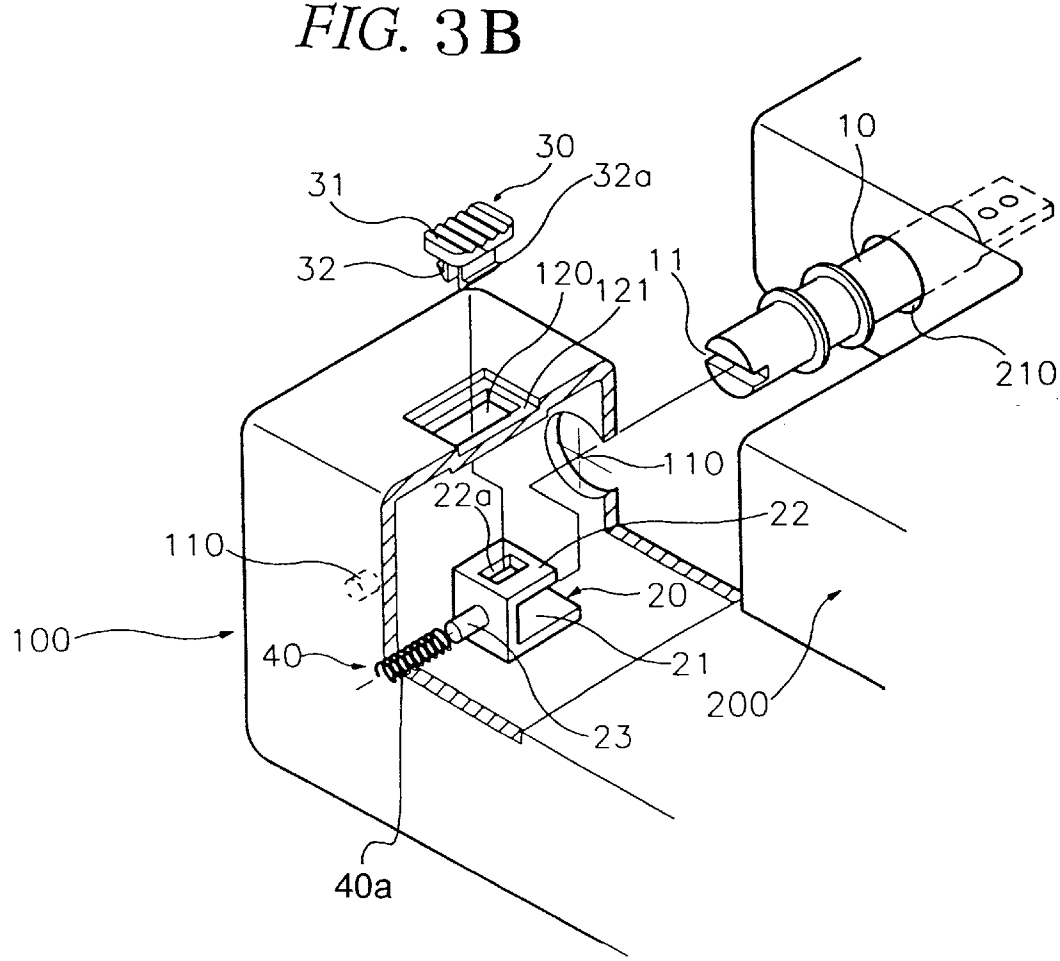

FIG. 3A is a perspective view of a portable computer with its cover closed according to the present invention and FIG. 3B is an exploded view showing the internal structure of portion “a” in FIG. 3A. In FIG. 3A, a shock buffering means of shock buffer 50 buffers a shock occurring when the cover 200 is folded down onto the upper surface of base 100.

In accordance with the present invention, this portable computer whose base 100 and cover 200 having a video display, the display being similar to that illustrated in FIGS. 1A and 1B, are coupled to hinging or hinge shafts 10 therein is made up of a setting member first member formed on at least one end of the hinging shafts 10, and a locking means or locking mechanism for being connected and disconnected to the setting member for allowing the cover to open or close. If the locking mechanism stated above will be described in a greater detail, the setting member is a locking groove 11 having a "-" shaped structure formed on an end of the hinging shaft 10.

In addition, the locking means includes a rectangular aperture 120 formed over the position (at the base 100) where the hinging shaft 10 is engaged; a fixing member 20 for being coupled to the locking groove 11 so as not to allow the hinged shaft to rotate, a handling member 30 (second member) for being coupled to the fixing member 20 and controlling its operation and an elastic member 40 for being coupled to the fixing member 20 and pushing the fixing member 20 toward the hinging shaft 10. At this time, the fixing member 20 has a stopper 21 to be inserted into the locking groove 11 and a connector 22 which is formed with the stopper 21 as a body and has a connecting aperture or hole 22*a,* through which the handling member 30 is coupled to the fixing member 20, formed over the stopper 21 the handling member 30 (second member) is positioned at a rear upper surface of the base 100 so as to outwardly exposed when the cover 200 is closed, as illustrated in FIG. 3A.

According to the construction as described above, the locking groove 11 and the stopper 21 are positioned for interconnection with each other when the cover of the computer folds down flat on the base 100. Besides, the handling member 30 is an external manual slide that includes a keeper 32 having a latch lug 32*a* formed under it, which engages the connecting hole 22*a* through the rectangular aperture 120. Also the fixing member 20, which is connected to the external manual slide 31, moves in the same direction of movement as the external manual slide 31. Further, a relatively lower recess 121 is formed on the base 100 so that the connection portion of the external manual slide 31 does not protrude out of the base 100.

The elastic member 40 includes a guide lug 23 formed on the outer surface of the fixing member 20, a fixing lug 110 formed on the inner surface of the base 100 which faces to the hinging shaft 10 in the same height and a compression coil spring 40*a* which will not deviate out of it when the fixing lug 110 and the guide lug 23 will have been interconnected to each other.

Figure 4A:
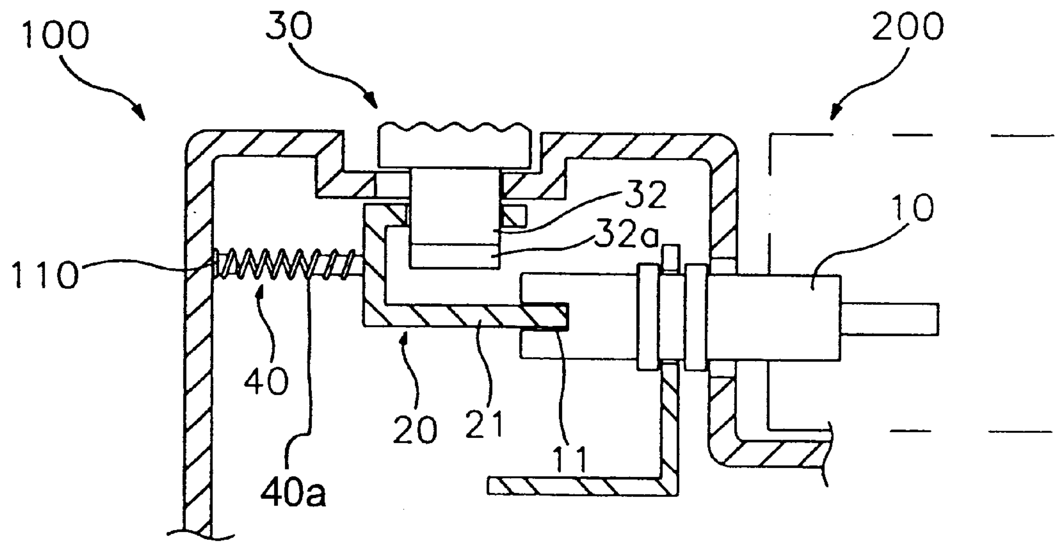
FIGS. 4A and 4B are sectional views showing the operations of the latch assembly in FIG. 3.
Figure 4B:
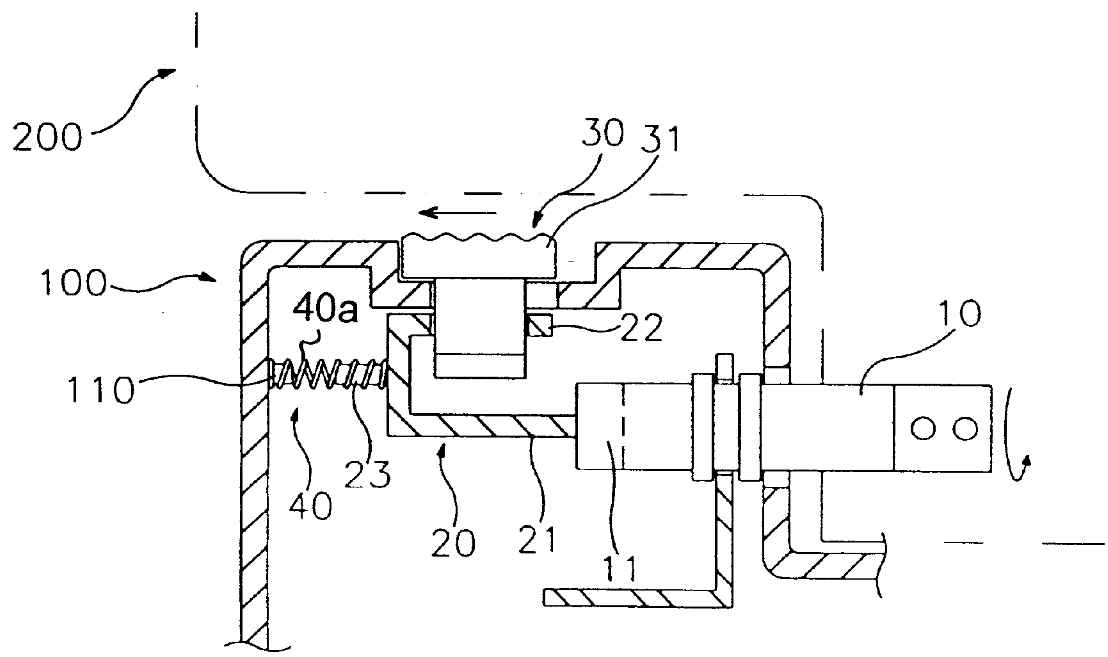
Figure 5A:
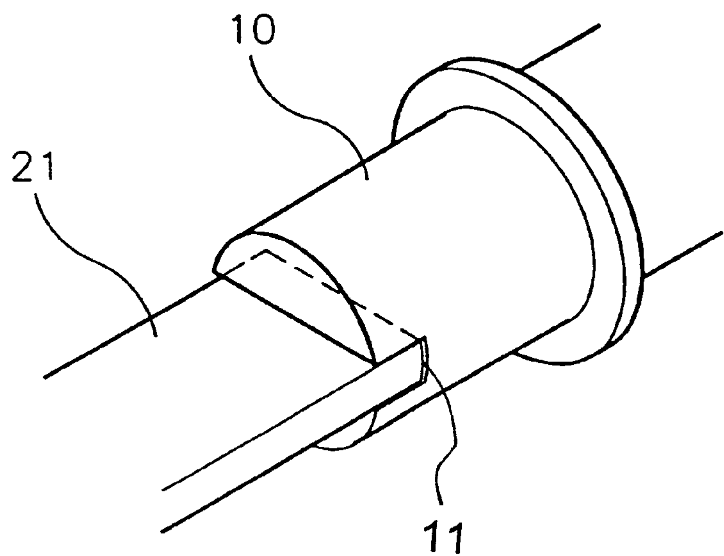
FIGS. 5A and 5B are detailed views showing the operation of the locking means in FIG. 4.

The assembly and operation of the locking mechanism according to the present invention with reference to FIGS. 4A and 4B will be now described. FIG. 4A is a sectional view showing the locking mechanism with the cover 200 securely fixed. In this figure, the stopper 21 is inserted into the locking groove 11 of the hinging shaft 10 by the elasticity of the spring, 40*a* which prevents the hinging shaft 10 from rotating. Accordingly, as shown in FIG. 5A, because the stopper 21 is inserted into the locking groove 11 of the hinging shaft 10 not to allow the hinging shaft 10 to rotate, the cover 200 folds down securely.

Figure 5B:
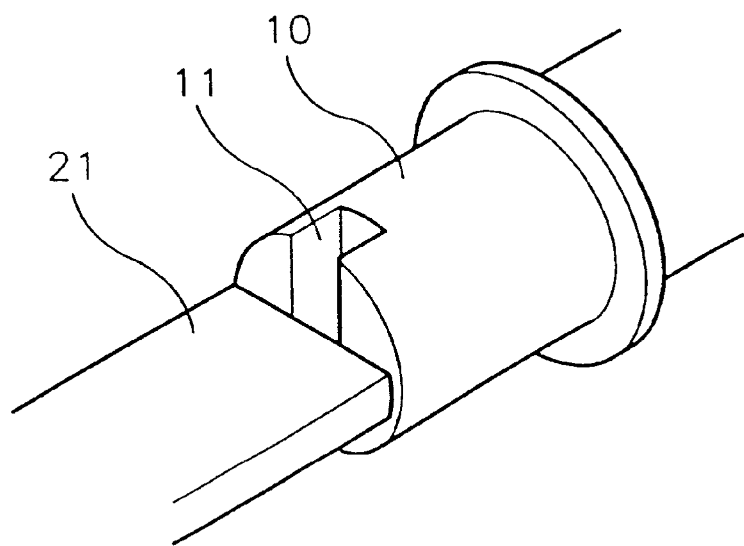

FIG. 4B is a sectional view showing a latch assembly with the cover with a display open by releasing the locking mechanism. When the latch or external manual slide 30 is pulled in an outward direction and the stopper 21 separates from the locking groove 11 of the hinging shaft 10, an operator can select the position that will provide the best angle to view the display. So, the positions of the stopper 21 and the groove 11 described hereinbefore are shown in FIG. 5B. After the use of the computer, when the cover folds down flat, the hinging shaft 10 rotates at the same time. Then, when the stopper 21 pushed by the elasticity of the spring 40*a* is inserted into the groove, 11 the locking state occurs again.

As described above, the display can be enlarged and its aesthetics can be also improved by the attaching of the locking mechanism to the hinging shaft 10. The interconnection of the locking mechanism to the hinging shaft 10 in the base 100 permits the display to enlarge and ameliorate its aesthetics.

Therefore, the advantage of the present invention is that a larger display can be provided in a limited space while the volume of the portable computer is not increased because the fixing member 20 is mounted to the inside of the base, 100 thereby leading to relieving consumers of complaints and meeting of their needs.

What is claimed is:

1. A portable computer, comprising:

a base;

a cover having a video display;

a pair of shafts, each of said pair of shafts coupling the base and the cover;

a first member formed on one end of a corresponding one of each of said pair of shafts, wherein said first member comprises a locking groove; and a locking mechanism respectively selectively engaging with and disconnecting from a corresponding said locking groove, said locking mechanism for selective connection to and disconnection from a corresponding said first member to allow the cover to selectively remain closed and to open, said locking mechanism comprising:

a fixing member selectively coupled to said locking groove in a corresponding shaft of said pair of shafts so as not to allow the corresponding said shaft to rotate;

a second member coupled to a corresponding said fixing member and controlling operation of the corresponding said fixing member; and an elastic member coupled to a corresponding said fixing member to selectively push the corresponding said fixing member toward a corresponding said shaft to engage a corresponding said first member, and each said fixing member being positioned in facing relation to a corresponding said shaft at a same height, and said fixing member having a stopper selectively inserted into a corresponding said locking groove and having a connector formed with the stopper as a body, the connector being positioned over the stopper, said connector coupling a corresponding said second member to a corresponding said fixing member.

2. The portable computer of claim 1, further comprising a shock buffer for buffering a shock occurring upon the cover being folded down on an upper surface of the base.

3. The portable computer of claim 2, further comprised of said shock buffer comprising a rubber member coated on at least one of the cover and the base.

4. The portable computer of claim 1, further comprised of said locking groove comprising a "-" shaped recessed structure.

5. The portable computer of claim 1, further comprised of said second member comprising an external manual slide that includes a keeper having a keeping lug formed under the keeper, the keeper having the keeping lug engaging with a corresponding said connector of a corresponding said fixing member.

6. The portable computer of claim 1, further comprised of said elastic member including: a guide lug formed on the fixing member; a fixing lug formed on an inner surface of the base of said portable computer; and a compression coil spring positioned not to deviate out of said elastic member when the fixing lug and the guide lug are interconnected to each other by the compression coil spring.

7. A portable computer, comprising:

a base;

a cover;

a shaft, said shaft coupling said base and said cover of said portable computer;

a locking groove formed on one end of said shaft; and a locking mechanism selectively connecting to and disconnecting from said locking groove, said locking mechanism selectively allowing and disallowing said cover of said portable computer to rotate to open, said locking mechanism comprising:

a locking member selectively coupled to the locking groove so as not to allow the shaft to rotate;

a selectively moveable latch coupled to the locking member and controlling operation of the locking member; and an elastic member coupled to the locking member to selectively push the locking member toward the shaft to engage the locking groove formed on the shaft, and said locking member being positioned in facing relation to the shaft at a same height, and said locking member having a stopper selectively inserted into the locking groove and having a connector formed with the stopper as a body, the connector being positioned over the stopper, said connector coupling the selectively moveable latch to the locking member.

8. The portable computer of claim 7, further comprised of said selectively moveable latch comprising an external manual slide that includes a keeper having a keeping lug formed under the keeper, the keeper having the keeping lug engaging with the connector of said locking member.

9. The portable computer of claim 7, further comprised of said elastic member including: a guide lug formed on the locking member; a locking lug formed on an inner surface of the base of the portable computer; and a compression coil spring positioned not to deviate out of the elastic member when the locking lug and the guide lug are interconnected to each other by the compression coil spring.

10. The portable computer of claim 7, further comprised of said locking groove comprising a “-” shaped recessed structure.

11. A portable computer, comprising:

a base;

a cover supporting a video display;

a pair of shafts, each of said pair of shafts coupling the base and the cover;

a first member formed on one end of a corresponding one of each of said pair of shafts;

a locking mechanism selectively engaging with and disengaging from a corresponding one of said pair of shafts, said locking mechanism selectively connecting to and disconnecting from a corresponding said first member to allow the cover to selectively remain closed and to open; and a second member coupled to said locking mechanism and controlling operation of said locking mechanism to selectively connect to and disconnect from a corresponding said first member, said second member being positioned at a rear upper surface of said base so as to be outwardly exposed when the cover is closed.

* * * * *